US010037258B2

United States Patent
Cunningham et al.

(10) Patent No.: US 10,037,258 B2
(45) Date of Patent: Jul. 31, 2018

(54) SYSTEM AND METHOD FOR INTELLIGENT THERMAL MANAGEMENT USING DYNAMIC PERFORMANCE FLOORS IN A PORTABLE COMPUTING DEVICE

(71) Applicant: QUALCOMM INCORPORATED, San Diego, CA (US)

(72) Inventors: Adam Cunningham, San Diego, CA (US); Kwangyoon Lee, San Diego, CA (US); Melanie Oclima, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 15/155,113

(22) Filed: May 16, 2016

(65) Prior Publication Data

US 2017/0220445 A1    Aug. 3, 2017

Related U.S. Application Data

(60) Provisional application No. 62/289,560, filed on Feb. 1, 2016, provisional application No. 62/297,503, filed on Feb. 19, 2016.

(51) Int. Cl.
| | | |
|---|---|---|
| *G06F 19/00* | (2018.01) | |
| *G06F 11/34* | (2006.01) | |
| *G06F 11/30* | (2006.01) | |
| *G06F 1/20* | (2006.01) | |

(52) U.S. Cl.
CPC .......... *G06F 11/3409* (2013.01); *G06F 1/203* (2013.01); *G06F 1/206* (2013.01); *G06F 11/3024* (2013.01); *G06F 11/3089* (2013.01)

(58) Field of Classification Search
CPC ...... H05B 37/0272; H01L 2224/48091; H01L 2924/181
USPC .......................... 702/132, 130, 182–185, 188
See application file for complete search history.

(56) References Cited

U.S. PATENT DOCUMENTS

| | | | |
|---|---|---|---|
| 6,442,700 | B1 | 8/2002 | Cooper |
| 8,972,759 | B2 | 3/2015 | Doshi et al. |
| 9,268,378 | B2 | 2/2016 | Rotem et al. |
| 2013/0013126 | A1* | 1/2013 | Salsbery ................. G06F 1/203 700/299 |
| 2013/0024715 | A1 | 1/2013 | Hung et al. |
| 2013/0079946 | A1* | 3/2013 | Anderson ............. G06F 1/3228 700/299 |
| 2013/0107905 | A1* | 5/2013 | Campbell ........... G01F 25/0007 374/1 |

(Continued)

OTHER PUBLICATIONS

International Search Report and Written Opinion—PCT/US2017/014984—ISA/EPO—dated Jul. 11, 2017.

*Primary Examiner* — Edward Raymond
(74) *Attorney, Agent, or Firm* — Smith Tempel Blaha LLC

(57) ABSTRACT

Various embodiments of methods and systems for intelligent thermal power management implemented in a portable computing device ("PCD") are disclosed. To mitigate or alleviate hysteresis associated with drastic changes in processing speeds for thermally aggressive processing components, embodiments of the solution dynamically adjust performance level floors in view of a temperature reading. Advantageously, embodiments work to manage thermal energy generation based on temperature sensor feedback that is relatively slow to detect temperature changes.

30 Claims, 11 Drawing Sheets

(56) References Cited

U.S. PATENT DOCUMENTS

| | | |
|---|---|---|
| 2013/0321041 A1 | 12/2013 | Kim et al. |
| 2014/0202678 A1* | 7/2014 | Goth ................ H05K 7/20772 165/287 |
| 2014/0365793 A1 | 12/2014 | Cox et al. |
| 2015/0057830 A1 | 2/2015 | Slaby et al. |
| 2015/0134988 A1 | 5/2015 | Wang et al. |
| 2015/0148981 A1 | 5/2015 | Kong et al. |
| 2015/0350407 A1 | 12/2015 | Hsu et al. |
| 2016/0018884 A1 | 1/2016 | Schulz et al. |

* cited by examiner

SYSTEM AND METHOD FOR INTELLIGENT THERMAL MANAGEMENT USING DYNAMIC PERFORMANCE FLOORS IN A PORTABLE COMPUTING DEVICE

CROSS REFERENCE AND PRIORITY CLAIM

This application claims priority under 35 U.S.C. § 119(e) to U.S. Provisional Patent Application Ser. No. 62/289,560, filed Feb. 1, 2016, entitled, "SYSTEM AND METHOD FOR INTELLIGENT THERMAL MANAGEMENT USING DYNAMIC PERFORMANCE FLOORS IN A PORTABLE COMPUTING DEVICE." This application also claims priority under 35 U.S.C. § 119(e) to U.S. Provisional Patent Application Ser. No. 62/297,503, filed Feb. 19, 2016, entitled, "SYSTEM AND METHOD FOR INTELLIGENT THERMAL MANAGEMENT USING TEMPERATURE RAMP SMOOTHING IN A PORTABLE COMPUTING DEVICE." The entire contents of these two provisional patent applications are hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat producing components are not positioned proximally to one another. Many PCDs may also rely on passive cooling devices, such as heat sinks, to manage thermal energy among the electronic components which collectively form a respective PCD.

The reality is that PCDs are typically limited in size and, therefore, room for components within a PCD often comes at a premium. As such, there rarely is enough space within a PCD for engineers and designers to mitigate thermal degradation or failure of processing components by using clever spatial arrangements or strategic placement of passive cooling components. Therefore, current systems and methods rely on various temperature sensors embedded on the PCD chip and elsewhere to monitor the dissipation of thermal energy and then use the measurements to trigger application of thermal power management techniques that adjust workload allocations, processing speeds, etc. to reduce thermal energy generation.

For example, in an effort to manage surface temperature of a PCD, prior art thermal power management techniques aggressively reduce processor performance until a given thermal sensor cools below a target thermal threshold. Such an approach to surface temperature management can be problematic, given that a slow reacting PCB thermistor is a common choice for a surface temperature sensor in a PCD. The effects of processor performance adjustments can be slow to reflect in the readings of a thermistor, thus lending to large swings in processor performance settings at the rate of thermal energy generation alternatively overshoots and undershoots a threshold target.

As another example, when steep temperature escalation is observed on a PCD while running SoC intensive use cases, such as benchmark apps, existing thermal management solutions only react to the steep ramp at the point in which the temperature reaches a target threshold. Inevitably in a steep temperature ramp scenario, such an approach of waiting to apply thermal mitigation measures until a target threshold is crossed can fail to prevent temperature overshoots that are the consequence of the escalated rate of thermal energy generation.

In response to the temperature overshoots, prior art thermal mitigation techniques reactively engage in drastic performance throttling and/or reactively execute thermal resets of processors in order to avoid violations of thermal specifications. The reactive measures taken by prior art thermal mitigation techniques when a temperature overshoot is recognized may achieve the goal of maintaining PCD temperatures within thermal specifications, but it usually comes at a high price to user experience as the reactive and drastic performance throttling causes performance hysteresis that negatively impacts a quality of service ("QoS") metric.

Therefore, what is needed in the art is a system and method for intelligent thermal management of a temperature in a PCD. More specifically, what is needed in the art is a system and method that manages a temperature by dynamically setting performance floors for processing components that generate thermal energy in a PCD. Also, what is needed in the art is a system and method that proactively manages a steep temperature rise and avoids target temperature overshoots in a PCD by taking thermal mitigation steps at pre-target mitigation levels.

SUMMARY OF THE DISCLOSURE

Various embodiments of methods and systems for intelligent thermal management techniques implemented in a portable computing device ("PCD") are disclosed. An exemplary embodiment of a method for intelligent thermal management comprises monitoring a temperature reading generated by a target temperature sensor and comparing the temperature reading to a temperature threshold. In certain embodiments, the temperature threshold may be associated with a skin temperature of the PCD and the target temperature sensor may be of a thermistor type. If the method determines that the temperature reading exceeds the temperature threshold, a first performance level floor may be set for one or more thermally aggressive processing components such that the components are not throttled to a performance level beneath the floor. A temperature tolerance in association with the floor may also be set. Next, a performance level of the thermally aggressive processing component may be reduced to a first lower performance level that is higher than the first performance level floor.

Subsequently, the exemplary embodiment may determine that the temperature reading remains in excess of the temperature threshold after the performance level of the processing component was reduced to the first lower performance level and, in response, reduce the performance level of the processing component to a second lower performance level that is higher than the first performance level floor.

Subsequently, the exemplary embodiment may determine that the temperature reading remains in excess of the temperature threshold after the performance level of the processing component was reduced to the second lower performance level and, in response, reduce the performance level of the processing component to a third lower performance level that is equivalent to the first performance level floor.

Subsequently, the exemplary embodiment may determine that the temperature reading remains in excess of the temperature threshold after the performance level of the processing component was reduced to the third lower performance level equivalent to the first performance level floor and, in response, maintain the performance level of the processing component at the third lower performance level for a period of time.

Subsequently, the exemplary embodiment may determine that the temperature reading is in excess of the temperature threshold plus the first temperature tolerance and, in response, adjust the performance level floor for at least one thermally aggressive processing component to a next lower performance level floor as well as adjust the first temperature tolerance to a second temperature tolerance setting associated with the next lower performance level floor. And then, the exemplary embodiment may reduce the performance level of the processing component to a fourth lower performance level that is lower than the first performance level floor and higher than the next lower performance level floor.

Subsequently, the exemplary embodiment may determine that the temperature reading is less than the temperature threshold plus the first temperature tolerance and, in response, adjust the performance level floor for at least one thermally aggressive processing component back to the first performance level floor. The exemplary embodiment may also adjust the second temperature tolerance back to the first temperature tolerance setting associated with the first performance level floor. And then, the exemplary embodiment may increase the performance level of the processing component to a performance level that is equivalent to, or higher than, the first performance level floor.

In another exemplary embodiment, a method for intelligent thermal management comprises monitoring a temperature reading generated by a temperature sensor. The temperature sensor may be a sensor associated with a junction temperature of a thermally aggressive processing component, a skin temperature of the PCD, etc. Alternatively, the temperature sensor may be a virtual sensor configured to generate a reading indicative of a delta between two readings of actual sensors. Based on the monitored temperature reading, the method may determine that the temperature reading indicates a temperature rise in excess of a temperature rise rate threshold and, in response, may establish one or more pre-target mitigation levels that are less than a target temperature threshold.

The method may also establish a performance level ceiling in association with each of the one or more pre-target mitigation levels. Having established the pre-target mitigation levels and associated performance level ceilings, the method may continue to monitor the temperature reading so that, as the temperature reading exceeds each of the one or more pre-target mitigation levels, the method may work to adjust a performance level of a thermal aggressor to the associated performance level ceiling. In this way, the method may lessen the rate of temperature rise without overly impacting user experience due to reactive throttling. When the temperature reading exceeds the target temperature threshold, the rise rate of the temperature reading will have been smoothed and control of the thermal management may be handed off to a primary thermal management technique triggered by the temperature target. The one or more previously established pre-target mitigation levels and associated performance level ceilings for the thermal aggressor may be removed.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
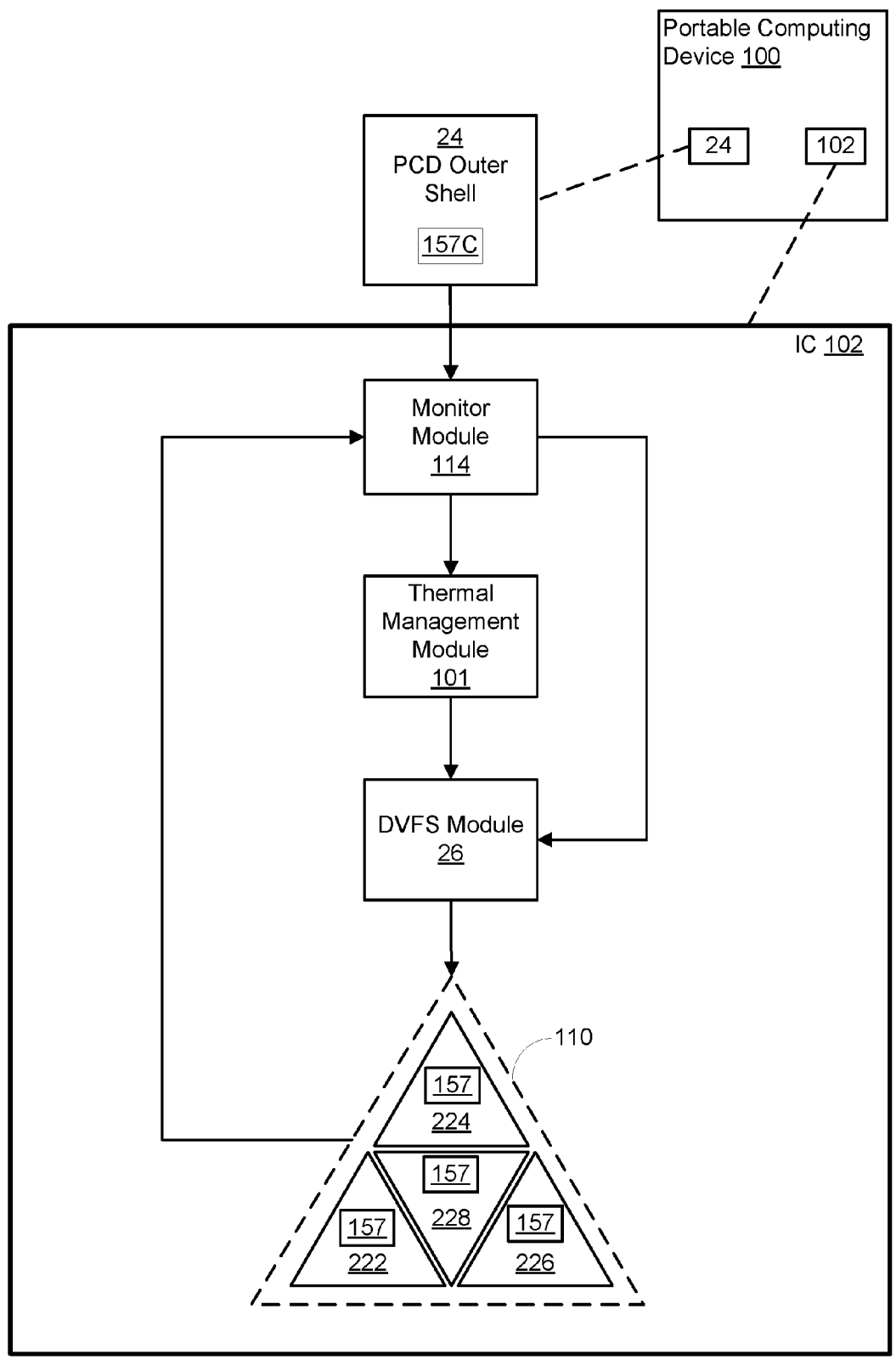
FIG. 1 is a functional block diagram illustrating an embodiment of an on-chip system for implementing intelligent thermal management of a temperature in a portable computing device ("PCD") through dynamic setting of processing component performance floors.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component," "thermal aggressor" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)." Additionally, to the extent that a CPU, DSP, GPU, chip or core is a functional component within a PCD that consumes various levels of power to operate at various levels of functional efficiency, one of ordinary skill in the art will recognize that the use of these terms does not limit the application of the disclosed embodiments, or their equivalents, to the context of processing components within a PCD.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component, i.e. a "thermal aggressor." For example, the "temperature" of two components is the same when the two components are in "thermal" equilibrium.

In this description, the terms "workload," "process load," "process workload," "use case workload" and the like are used interchangeably and generally directed toward the processing burden, or percentage of processing burden, associated with a given processing component in a given embodiment.

In this description, the terms "thermal mitigation technique(s)," "thermal policies," "thermal power management," "thermal mitigation measure(s)," "throttling" and the like are used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals.

In this description, the term "performance floor" refers to a lowest allowable performance level, or processing speed, to which a dynamic voltage and frequency scaling ("DVFS") module may throttle a target thermal aggressor. Embodiments of the solution may dynamically adjust a performance floor depending on various parameters.

In this description, the term "tolerance value," "temperature tolerance" and the like refer to an amount of increase in a temperature reading from a target sensor that may trigger dynamic adjustment of a performance floor setting. Notably, a tolerance value may differ depending on the active performance floor setting.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Managing thermal energy generation in a PCD, without unnecessarily impacting quality of service ("QoS"), can be accomplished by monitoring one or more sensor measurements that correlate with the outer shell temperature, i.e. "skin" temperature, of the PCD. By closely monitoring the skin temperature, an intelligent thermal management solution in a PCD may systematically adjust performance settings of active processing components in an effort to optimize user experience without causing the performance settings to fall unnecessarily below a performance floor. Advantageously, by smartly adjusting performance floors for thermally aggressive components, intelligent thermal management systems and methods can optimize QoS without causing a critical temperature measurement (such as a PCD outer shell temperature) to be exceeded.

Notably, although exemplary embodiments of intelligent thermal management methods are described herein in the context of managing a "skin temperature" or "outer shell temperature" of a PCD, application of intelligent thermal management methodologies are not limited to skin temperature applications. It is envisioned that embodiments of intelligent thermal management methods may be extended to any temperature/temperature sensor within a system on a chip ("SoC").

Existing thermal management algorithms for managing a PCD surface temperature cause performance levels of thermally aggressive processing components to swing above and below a thermally sustainable performance level. This performance hysteresis results in a poor user experience ("Ux") as the processing components are constantly ramped up and down in response to a lagging temperature reading. Performance settings are aggressively reduced until a user defined thermal sensor cools below a user defined target threshold. In the case of managing for surface temperature, particularly, this prior art approach can be problematic, given that a slow reacting PCB thermistor is generally used for measuring surface temperature.

The reason that PCB thermistors are preferred over other chipset thermal sensors for monitoring a PCD skin temperature is that the PCB thermistors correlate better with actual skin temperature. That is, the delta between a PCB thermistor reading and actual surface temperature of the PCD may be significantly less than the delta between a chipset thermal sensor reading and actual surface temperature. Even so, because a PCB thermistor may be relatively slow to respond to temperature changes, prior art thermal management solutions that adjust processor performance in view of a PCD thermistor reading may suffer from unnecessary processor performance dips and overall erratic performance settings.

As an example of how existing thermal management solutions respond to changes in surface temperature readings in a PCD, consider a system configured to throttle a CPU to any of three performance levels (with the lowest performance level generating a lowest amount of thermal energy and the highest performance level generating a highest amount of thermal energy). As would be understood by one of ordinary skill in the art, the existing thermal management approach may progressively reduce the performance level of the CPU each sampling period that the surface temperature sensor generates a reading above a target threshold.

For example, with the surface temperature sensor generating a reading above a 45° C. threshold, a first step may be to throttle the CPU to 1.5 GHz in order to reduce the amount of thermal energy being actively generated by the CPU. After a sampling period, if the sensor is still generating a reading above the 45° C. threshold, the CPU may be stepped down again to 1 GHz and then to 800 MHz. With the temperature reading remaining above the 45° C. threshold for three sampling periods, the prior art method reacted by stepping the CPU processing speed all the way down to 800 MHz even though the temperature may have eventually cleared below the threshold with the CPU remaining at the 1.5 GHz level. As a result, when the temperature reading finally does indicate that the temperature is below the threshold, the CPU processing speed may be ramped back up to full power, thereby causing another temperature alarm. The "bursty" performance of the CPU is the consequence of a slowly reacting temperature sensor and it ultimately results in a poor Ux.

Existing solutions to the scenario described above use dynamic CPU throttling and set a single performance level floor above which the CPU performance level will be maintained. The problem is that this floor may be set too low or too high, depending on the active use case in the PCD—a single performance level floor may be ideal for one use case and less than ideal for another. If the performance level floor is set high for a given use case, the skin temperature of the PCD will continue to rise during that use case. Conversely, if the performance level floor is set too low for a given use case, the quality of service ("QoS") may suffer as processing performance is unnecessarily impacted.

Advantageously, embodiments of the present solution intelligently manage thermal energy generation by dynamically adjusting a performance level floor for a thermal aggressor in view of a tolerance value associated with the active performance level floor. When thermal mitigation causes a given thermal aggressor (i.e., processing component) to be throttled to a first performance floor, embodiments of the solution will dynamically adjust the performance floor should a target temperature reading continue to rise above a certain temperature tolerance value. In this way, excess thermal energy is given an opportunity to dissipate and be reflected by a target sensor reading before processing performance is unnecessarily throttled.

As an example of an application of an exemplary embodiment, various parameters may be defined including, but not limited to:

a) Target temperature threshold—temperature reading at which throttling of a given thermal aggressor(s) is triggered;
b) Target sensor—temperature sensor monitored for target temperature threshold reading;
c) Thermal aggressor—processing component that is subject to throttling of processing speed in order to manage thermal energy generation;
d) Performance floor 1—performance level floor defining a minimum performance setting associated with a highest performance setting range of the thermal aggressor;
e) Temperature tolerance floor 1—the amount of temperature reading increase over the target temperature threshold that will trigger adjustment of the performance floor 1 to a performance floor 2;
f) Performance floor 2—performance level floor defining a minimum performance setting associated with a performance setting range of the thermal aggressor that is lower than that which is associated with Performance floor 1;
g) Temperature tolerance floor 2—the amount of temperature reading increase over the target temperature threshold that will trigger adjustment of the performance floor 2 to a performance floor 3;
h) Performance floor N—performance level floor defining a minimum performance setting associated with a lowest allowable performance setting range of the thermal aggressor;
i) Temperature tolerance floor N—the amount of temperature reading increase over the target temperature threshold that will trigger removal of all performance floor limitations;
j) Sampling period—a predefined duration between temperature readings from the target sensor that may trigger an adjustment to a processing level for the thermal aggressor and/or the performance floor.

In operation, the exemplary embodiment may respond to a temperature reading above the target temperature threshold by setting the performance floor to Performance floor 1 and proceeding to reduce the performance level of the thermal aggressor, one level at a time, for each sampling period. If the performance level requested for the thermal aggressor is below the Performance floor 1, the embodiment may deny further reduction in the performance level so that the active performance level is maintained at the Performance floor 1. If the temperature reading continues to rise to the point that it exceeds "Target temperature threshold+temperature tolerance floor X" then the embodiment may adjust the current performance floor X to "Performance floor X+1" and reset the Temperature tolerance floor to "Temperature tolerance floor X+1." Subsequently, if the monitored temperature reading falls below the target temperature threshold plus the active temperature tolerance, the exemplary embodiment may adjust the performance floor and temperature tolerance floor back up to the previous settings, in this example "Performance floor X" and "Temperature tolerance floor X."

Notably, although the exemplary embodiments described herein make adjustments to the performance floors based on temperature readings, it is envisioned that certain embodiments may adjust the performance floors for a thermal aggressor based on a power consumption measurement of that thermal aggressor. As power consumption may be correlated to thermal energy generation by a processing component, certain embodiments may monitor power consumption as a trigger for dynamic floor adjustment. In such embodiments, the performance floors may be raised or lowered in an effort to saturate an average power consumption level at a thermally sustainable level.

Prior art solutions generally seek to progressively lower performance ceilings without establishing performance floors. By contrast, embodiments of the present solution progressively lower (and raise) performance floors without dictating a maximum allowable performance setting above that ceiling. Following the above example with exemplary parameter settings, consider the following settings as applied according to an embodiment of the solution when a PCD is running a sustained use case in the form of a 3D gaming application:

a) Target temperature threshold: 45° C.
    b) Target sensor type: PCD thermistor
    c) Thermal aggressor: CPU
    d) Performance floor 1: 1.5 GHz
    e) Temperature tolerance floor 1: 1° C.
    f) Performance floor 2: 1.3 GHz
    g) Temperature tolerance floor 2: 1° C.
    h) Performance floor 3: 1 GHz
    i) Temperature tolerance floor 3: 5° C.
    j) Sampling period: 1000 ms Execution of the exemplary embodiment in response to the 3D gaming use case causing the target temperature threshold to be exceeded may play out as following. The PCD thermistor generates a reading indicating that the 45° C. target temperature threshold has been crossed. In response, the CPU frequency may be dynamically throttled, one performance level at a time, until the performance floor 1 processing speed of 1.5 GHz is reached. Holding the CPU processing speed at 1.5 GHz, the temperature reading may continue to rise to 46° C. which is in excess of the target temperature threshold plus the 1° C. temperature tolerance associated with performance floor 1. In response, the exemplary embodiment may adjust the performance floor from performance floor 1 to performance floor 2 (and reset the temperature tolerance to the temperature tolerance associated with performance floor 2—1° C. for temperature tolerance floor 1 plus 1° C. for temperature tolerance floor 2, thereby making the temperature tolerance associated with performance floor 2 equal to 2° C. over the target temperature threshold), thereby allowing the CPU to be throttled to a performance level as low as 1.3 GHz in an effort to further mitigate thermal energy generation. The temperature reading generated by the PCD thermistor may subsequently stabilize and begin to cool. When the temperature reading falls below 46° C., the exemplary embodiment may recognize that the temperature reading is below the target temperature plus the floor 1 temperature tolerance and, in response, may adjust the performance floor back to performance floor 1 such that the processing speed of the CPU is allowed to increase. With temperature floor 1 reinstated, the temperature reading may saturate below the target temperature threshold. Advantageously, by leveraging the ability to set and adjust the performance floor of the CPU, wide swings and drastic jumps between processing speeds for the CPU may have been mitigated or altogether avoided such that processing performance (and, by extension, Ux as measured by QoS) was predictable, consistent and stable.

FIG. 1 is a functional block diagram illustrating an embodiment of an on-chip system 102 for implementing intelligent thermal management of a temperature in a portable computing device ("PCD") 100 through dynamic setting of performance floors for thermally aggressive processing components. Advantageously, by dynamically adjusting performance floors for one or more thermally aggressive processing components, embodiments of intelligent thermal management the systems and methods may address excess generation of thermal energy affecting skin temperature of the PCD without overly impacting the overall user experience ("Ux").

In general, the system employs three main modules which, in some embodiments, may be contained in one or two modules: (1) a dynamic frequency and voltage scaling ("DVFS") module 26 for throttling performance levels of a thermally aggressive processing component; (2) a monitor module 114 for monitoring temperature readings from a target temperature sensor(s) and performance settings; and (3) a Thermal Management ("TM") module 101 for setting and adjusting performance floors and working with the DVFS module 26 to throttle thermally aggressive processing components. Advantageously, embodiments of the system and method that include the three main modules optimize the overall Ux regardless of use case workload while maintaining skin temperatures beneath acceptable thresholds.

In the exemplary embodiment of FIG. 1, monitor module 114 monitors various performance levels associated with thermally aggressive processing component CPU 110. As depicted in the FIG. 1 illustration, CPU 110 is a heterogeneous processing component comprised of multiple cores 222, 226, 224, 228, any one or more of which may be generating excess thermal energy that, when dissipated, affects the outer surface temperature (i.e., the skin temperature) of the PCD outer shell 24. Also, the monitor module 114 monitors temperature sensor 157C associated with the outer shell 24. Commonly, temperature sensor 157C may be of PCB thermistor type that, while useful for generating an accurate reading of the skin temperature, may be slow to respond to changes in the skin temperature. The monitor module 114 may relay data indicative of the active performance level settings of the CPU 110 and/or the skin temperature measured by the sensor 157C to the TM module 101 and/or DVFS module 26.

Notably, a change in the outer shell 24 temperature measured by sensor 157C (or otherwise calculated from power consumption of CPU 110) may be recognized by the monitor module 114 and relayed to TM module 101. The TM module 101 may, in turn, establish a performance floor for the CPU 110 to ensure that the PCD outer shell temperature 24 (i.e., skin temperature) as measured by sensor 157C is maintained below a given threshold.

From the data provided by the monitor module 114, the TM module 101 may recognize that a thermal temperature threshold has been, or could be, exceeded and determine that a performance level associated with active, thermally aggressive processing components (e.g., CPU 110 in the FIG. 1 illustration) should be adjusted in order to mitigate ongoing thermal energy generation, subject to a performance level floor and temperature tolerance for that particular performance level floor. Subject to the performance level floor and temperature tolerance, the TM module 101 may instruct the DVFS module 26 to determine appropriate adjustments to the performance level setting of the CPU 110. Similarly, if the TM module 101 determines that there is available headroom to increase the performance level of the CPU 110, i.e. that user experience may be improved by an increase in power consumption that will not cause the skin temperature threshold to be exceeded or continue to rise, then the TM module 101 may adjust the performance level floor (or remove it altogether) and instruct the DVFS module 26 to determine appropriate adjustments to the performance levels within those constraints and/or the constraints dictated by other thermal management techniques.

Notably, although the exemplary embodiment illustrated in FIG. 1 offers the heterogeneous CPU 110 as a thermal aggressor that may be throttled according to an embodiment of an intelligent thermal management solution, it will be understood that embodiments of the solution may be applicable to any thermally aggressive processing component in need of throttling to affect a temperature reading as measured by a temperature sensor. As such, although the exemplary embodiment illustrates a CPU 110 being throttled in view of a reading generated by a PCB thermistor positioned to measure the outer shell temperature of a PCD 110, it is envisioned that embodiments of the solution are applicable to other combinations of sensors and processing components. The scope of this disclosure, therefore, is not limited to the specific applications described herein.

Figure 2:
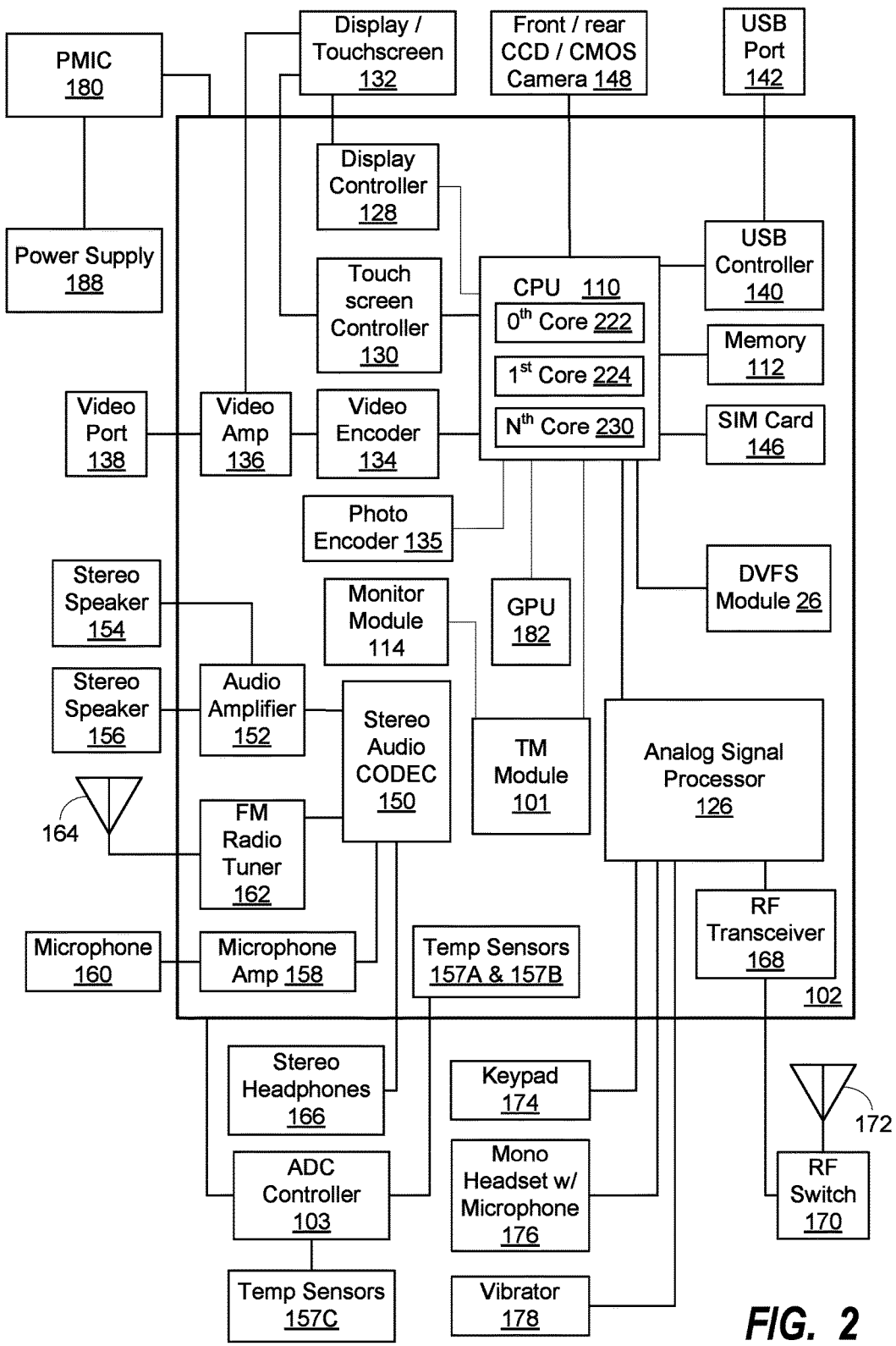
FIG. 2 is a functional block diagram illustrating an exemplary, non-limiting aspect of the PCD of FIG. 1 in the form of a wireless telephone for implementing methods and systems for intelligent thermal management.

FIG. 2 is a functional block diagram illustrating an exemplary, non-limiting aspect of the PCD 100 of FIG. 1 in the form of a wireless telephone for implementing methods and systems for intelligent thermal management. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the monitor module 114, DVFS module 26 and TM module 101 may be collectively responsible for monitoring a temperature sensor reading, setting performance level floors and temperature tolerances, and adjusting processing component performance levels, such that thermal energy generation is managed and user experience is optimized. The monitor module 114 may communicate with multiple operational sensors (e.g., thermal sensors 157A, 157B) distributed throughout the on-chip system 102 and with the CPU 110 of the PCD 100 as well as with the DVFS module 26 and TM module 101. In some embodiments, monitor module 114 may monitor skin temperature sensors 157C for temperature readings associated with a touch temperature of PCD 100. In other embodiments, monitor module 114 may infer touch temperatures based on power consumption measurements. The TM module 101 may work with the monitor module 114 to identify temperature thresholds and/or power budgets that have been exceeded, dynamically adjust performance level floors, and instruct the DVFS module 26 to make performance setting adjustments associated with power consuming components within chip 102 in an effort to maintain a touch temperature below a threshold without unnecessarily impacting user experience.

As illustrated in FIG. 2, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 188, for example a battery, is coupled to the on-chip system 102 through power management integrated circuit ("PMIC") 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157B, 157C may be employed without departing from the scope of the invention.

The TPM module(s) 101 may comprise software which is executed by the CPU 110. However, the TPM module(s) 101 may also be formed from hardware and/or firmware without departing from the scope of the invention. The TPM module 101 may be responsible for working with the monitor module 114 and the DVFS module 26 to dynamically set and adjust performance level floors based on temperature readings and temperature tolerances relative to a threshold and selecting and making adjustments to performance settings associated with active processing components in a given use case such that thermal energy generation is managed and user experience is optimized.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more DVFS module(s) 26, monitor module(s) 114 and/or TM module(s) 101. These instructions that form the module(s) 101, 26, 114 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 3:
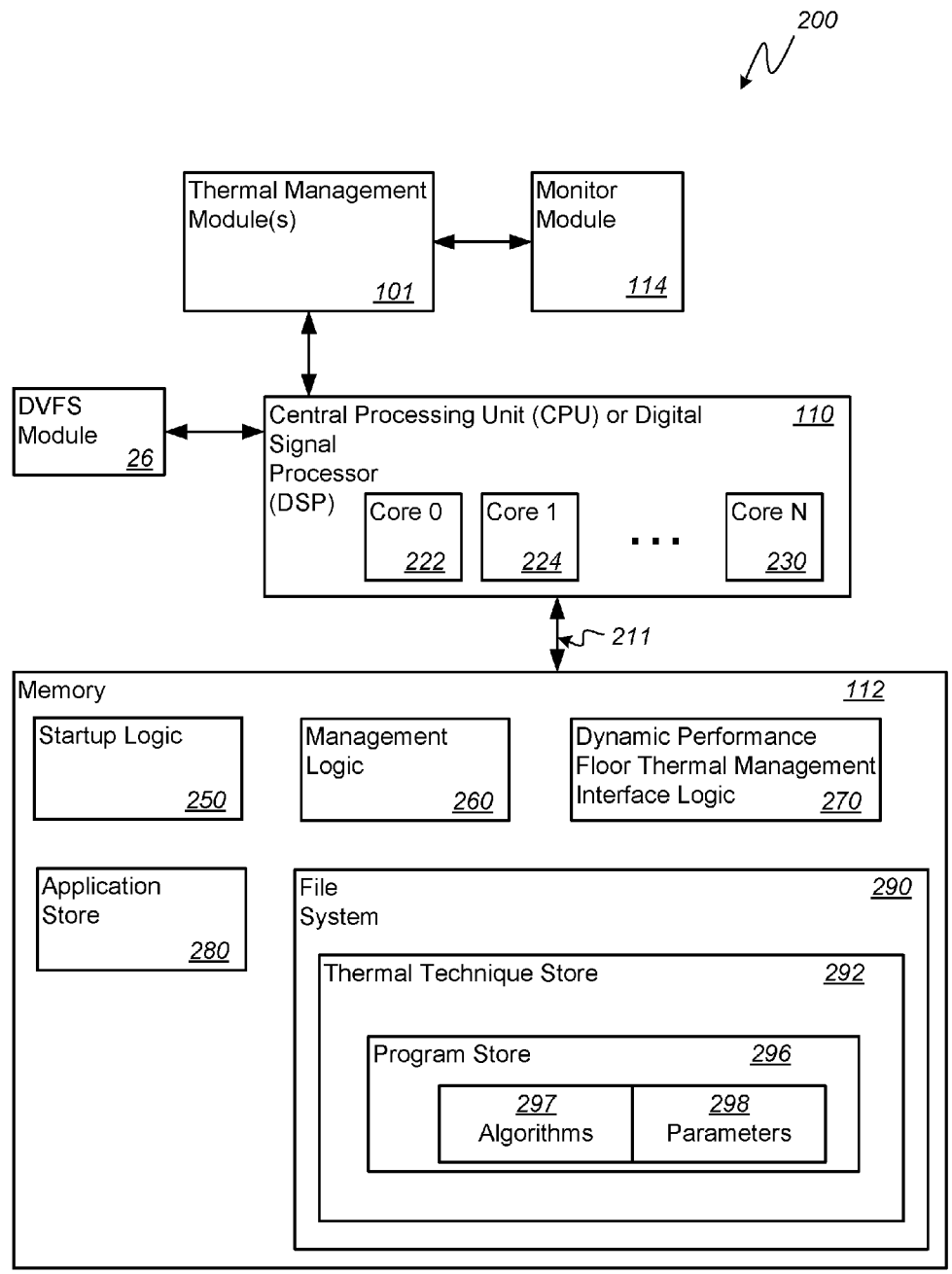
FIG. 3 is a schematic diagram illustrating an exemplary software architecture of the PCD of FIG. 2 for intelligent thermal management.

FIG. 3 is a schematic diagram illustrating an exemplary software architecture of the PCD 100 of FIG. 2 for intelligent thermal management. Any number of algorithms may form or be part of at least one intelligent thermal power management policy that may be applied by the DVFS module(s) 26, monitor module(s) 114 and/or TM module(s) 101 when certain thermal conditions are met, however, in a preferred embodiment the DVFS module(s) 26, monitor module(s) 114 and/or TM module(s) 101 work together to adjust performance level settings of active processing components in a use case including, but not limited to, LCD display 132, GPU 182, CPU 110, etc. The performance level settings are adjusted subject to performance level floors and temperature tolerances that are set in view of skin temperature measurements.

As illustrated in FIG. 3, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the DVFS module(s) 26 and/or TM module(s) 101 that may comprise software and/or hardware. If embodied as software, the module(s) 26, 101 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 3, it should be noted that one or more of startup logic 250, management logic 260, dynamic performance floor thermal management interface logic 270, applications in application store 280 and portions of the file system 290 may be stored on any computer-readable medium (or device) for use by, or in connection with, any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the thermal management interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for managing or controlling the performance of one or more of the available cores such as the first core 222, the second core 224 through to the $N^{th}$ core 230. The startup logic 250 may identify, load and execute a select program for intelligent thermal management based on dynamic adjustment of performance level floors. An exemplary select program can be found in the program store 296 of the embedded file system 290 and is defined by a specific combination of an intelligent thermal management algorithm 297 and a set of parameters 298. The exemplary select program, when executed by one or more of the core processors in the CPU 110 may operate in accordance with one or more signals provided by the monitor module 114 in combination with control signals provided by the one or more DVFS module(s) 26 and/or TM module(s) 101 to adjust the performance setting associated with a particular active component "up" or "down."

The management logic 260 includes one or more executable instructions for terminating an intelligent thermal management program, as well as selectively identifying, loading, and executing a more suitable replacement program. The management logic 260 is arranged to perform these functions at run time or while the PCD 100 is powered and in use by an operator of the device. A replacement program can be found in the program store 296 of the embedded file system 290 and, in some embodiments, may be defined by a specific combination of an intelligent thermal management algorithm 297 and a set of parameters 298.

The replacement program, when executed by one or more of the core processors in the digital signal processor may operate in accordance with one or more signals provided by the monitor module 114 or one or more signals provided on the respective control inputs of the various processor cores to adjust the settings of one or more performance settings associated with processing components subject to performance level floors and temperature tolerances.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the parameters associated with throttling a particular thermally aggressive component.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermal technique store 292. In this regard, the file system 290 may include a reserved section of its total file system capacity for the storage of information for the configuration and management of the various parameters 298 and algorithms 297 used by the PCD 100. As shown in FIG. 3, the store 292 includes a component store 294, which includes a program store 296, which includes one or more intelligent thermal management programs.

Figure 4:
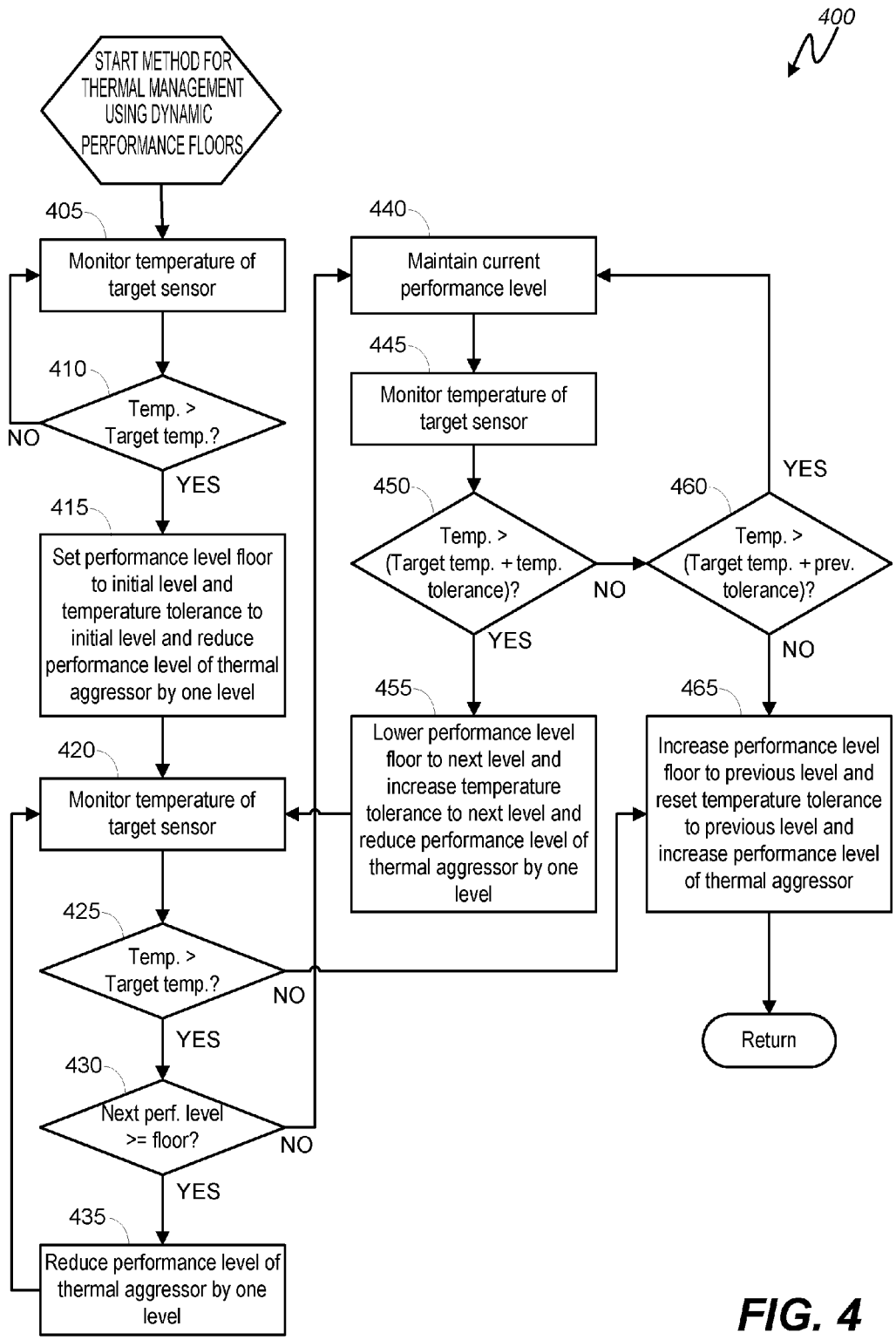
FIG. 4 depicts a logical flowchart illustrating a method for intelligent thermal management in the PCD of FIG. 1 through dynamic setting of processing component performance floors.

FIG. 4 depicts a logical flowchart illustrating a method 400 for intelligent thermal management in the PCD of FIG. 1 through dynamic setting of processing component performance floors. Beginning at block 405, the temperature reading generated by a target sensor, such as a PCB thermistor positioned to measure the skin temperature of a PCD 100, is monitored in order to detect any violation of a target temperature threshold. At decision block 410, if the measured temperature does not exceed a target temperature, the "no" branch is followed back to block 405 and the target sensor measurement continues to be monitored. If, however, at decision block 410 it is determined that the measured temperature reading exceeds the target temperature (such as a skin temperature threshold), the "yes" branch is followed to block 415.

At block 415, in order to mitigate generation of excess thermal energy without unnecessarily throttling the performance of a thermally aggressive processing component, a performance floor is set and a temperature tolerance associated with that performance floor is also set. Subsequently, the thermally aggressive processing component which has caused (or contributed to) the target temperature to be exceeded is throttled by reducing its performance level by one level. At block 420, the target sensor is monitored to determine if the reduction in the performance level has a positive impact on the measured temperature.

At decision block 425, if the measured temperature is no longer in excess of the target temperature, the "no" block is followed to block 465 and the performance level of the processing component is allowed to increase. If, however, the measured temperature remains in excess of the target temperature even after the reduction in the performance level at block 415, then the "yes" branch is followed from decision block 425 to decision block 430. At decision block 430, if a next lower performance level is available and above the performance level floor set at block 415, then the performance level of the processing component is further reduced at block 435 and steps 420 through 430 are repeated.

If, however, at decision block 430 it is determined that there is no further performance level reduction available without going beneath the performance level floor set at block 415, the method 400 follows the "no" branch to block 440 and the current performance level of the processing component is maintained without further adjustment at that time.

Once the performance level setting of the thermally aggressive processing component is throttled down to the performance level floor (at block 440), the method 400 continues to monitor the temperature reading of the target temperature sensor at block 445. At decision block 450, if the temperature measurement generated by the target sensor continues to climb such that it exceeds the sum of the target temperature and the temperature tolerance set at block 415, the "yes" branch is followed to block 455. At block 445, the next lower performance level floor is instituted and the temperature tolerance is adjusted to a tolerance associated with the newly instituted lower performance level floor. Also, now that the performance level floor has been lowered to the next available level, the performance level of the thermally aggressive processing component may be lowered to a level beneath the previous floor. The method 400 continues back to block 420 and the algorithm from blocks 420 to 450 repeats in view of the newly set performance level floor and temperature tolerance.

If, however, at decision block 450 the temperature measurement generated by the target sensor remains below the sum of the target temperature and the temperature tolerance set at block 415 (or, subsequently, set at block 455), the "no" branch is followed to decision block 460. At decision block 460, if the temperature measurement remains above the target temperature plus the previous temperature tolerance setting associated with a previous performance level floor (although beneath the sum of the target temperature and the actively set temperature tolerance), the "yes" branch is followed back to block 440 and the current performance level (which presumably equals the currently set performance level floor) for the thermally aggressive processing component is maintained.

If, at decision block 460, the temperature measurement does not exceed the target temperature plus the previous temperature tolerance setting associated with a previous performance level floor, then the "no" branch is followed to block 465. At block 465, an increase in the performance level of the processing component may be authorized. Also, at block 465, a current performance level floor and its associated temperature tolerance level may be adjusted to a next higher performance level floor (or removed altogether) such that the performance level of the processing component may be ramped up. As would be inherently understood by one of ordinary skill in the art reviewing this disclosure, the method 400 may continue to increase the performance levels of the thermal aggressor per block 465 so long as the temperature remained above the target temperature but beneath the sum of the target temperature and the currently set temperature tolerance.

In this way, the method 400 may continue to increase performance level floors and reset temperature tolerances in association with those floors, so long as the measured temperature fell within the various ranges of the target temperature plus temperature tolerance. Moreover, if the temperature begins to rise such that increasing the performance level of the aggressor and/or the performance level floor is not justified by the method 400 algorithm, the method 400 may begin lowering the performance level floor, resetting the temperature tolerance in association with the lowered floor, and lowering the performance level of the thermal aggressor as previously described. The method 400 returns.

Referring now to FIGS. 5-11, exemplary embodiments of the present solution illustrated in FIGS. 5-11 may intelligently manage thermal energy generation by recognizing steep thermal energy generation rates and then smoothing the rate of thermal energy generation to avoid target threshold overshoots. To do so, embodiments of the solution as illustrated in FIGS. 5-11 set multiple levels of pre-target mitigation, thereby ensuring a relatively gradual and smoother temperature increase toward the target threshold.

Notably, it is envisioned that embodiments of this solution (as illustrated in FIGS. 5-11) may compliment primary thermal management approaches as thermal management may be handed off to the primary thermal management approach when the temperature reaches the target threshold. Advantageously, though, when the target threshold is reached the smoothed rate of thermal energy generation resulting from the pre-target mitigation approach may have avoided any significant overshoot that would trigger undesirable drastic throttling measures by the primary thermal management method.

In addition to a primary thermal management system and method, embodiments of the solution generally work to detect a steep temperature ramp that, if left unchecked, could cause a detrimental overshoot of a target temperature and, in response to that detection, set pre-target mitigation levels at which a performance ceiling for a thermal aggressor is adjusted. It is envisioned that a steep temperature ramp may be detected any number of ways including, but not limited to, monitoring a temperature sensor in view of a temperature increase rate, recognizing execution of a use case known to cause high rates of thermal energy generation, and/or monitoring a virtual sensor indicating a delta between a remote "cool" sensor and a sensor associated with a thermal aggressor.

When a steep temperature ramp is detected, the embodiments of FIGS. 5-11 may take pre-target mitigation measures by applying performance ceilings, migrating workloads, or taking other measures that will work to slow the detected rate of thermal energy generation. Importantly, one goal of the exemplary embodiments of FIGS. 5-11 is to slow the rate of thermal energy generation as a rising temperature measurement approaches a target threshold so that the threshold is not significantly overshot.

In this way, it may not be a goal of embodiments of the solution to cause a temperature measurement to decrease back below a threshold but, rather, to smooth the incline of a temperature measurement toward a target threshold such that, when the temperature measurement nears or reaches the target threshold, temperature management may be handed off to a primary thermal management algorithm without triggering aggressive throttling measures.

Figure 5:
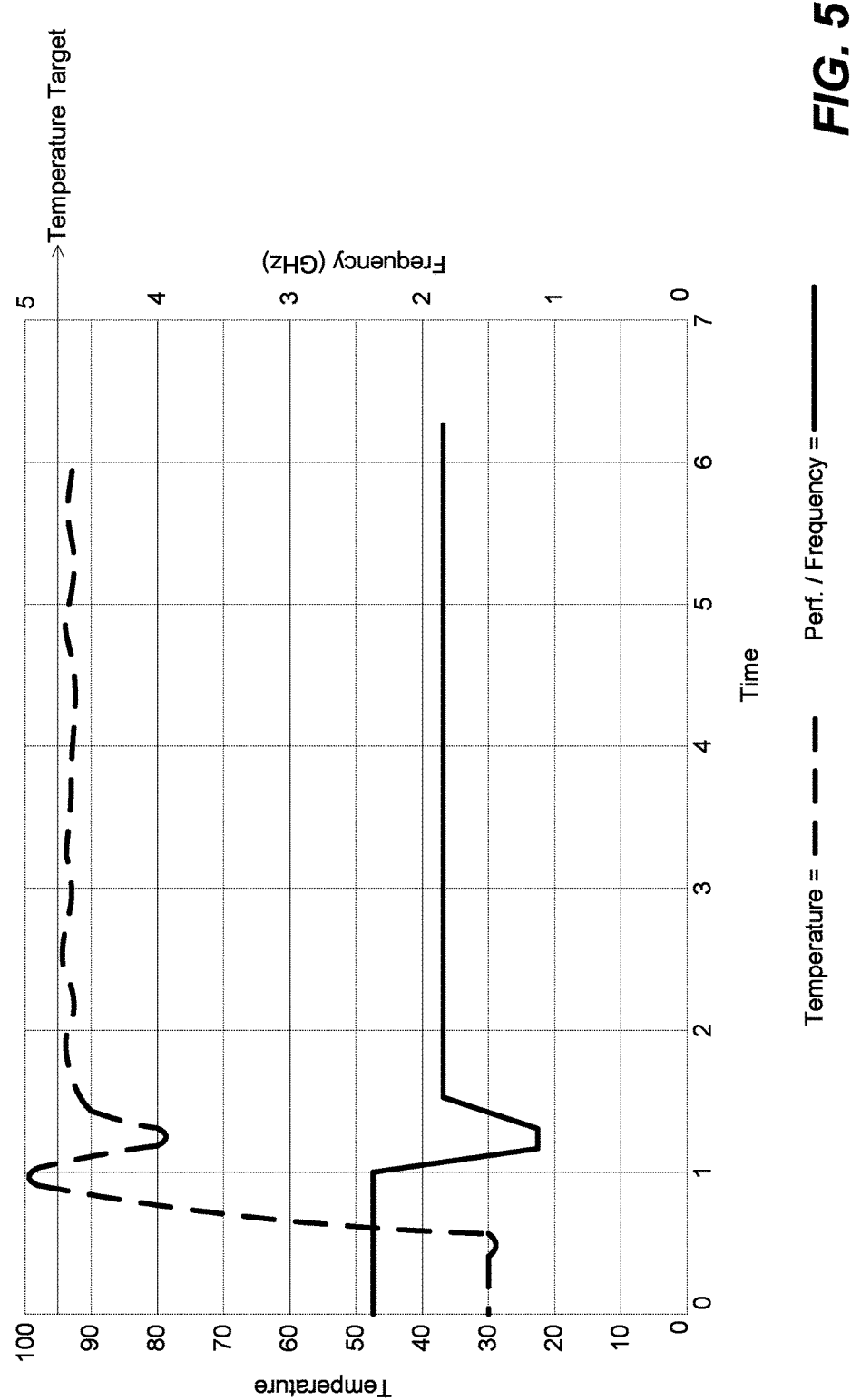
FIG. 5 is a graph illustrating the effects on processor performance by a typical prior art thermal mitigation approach reacting to a steep temperature rise event.

FIG. 5 is a graph 500A illustrating the effects on processor performance by a typical prior art thermal mitigation approach reacting to a steep temperature rise event. In the graph the dashed line represents a monitored temperature over time, such as may be monitored by a temperature sensor associated with a junction temperature of a processing component. The solid line represents performance levels of a thermal aggressor over time.

Beginning at time "0," it can be seen from the graph that the thermal aggressor is running at a nearly 50% performance level. Just before time "1," a thermal event takes place that causes a steep incline in thermal energy generation and, consequently, in a temperature measurement as indicated by the dashed line. The temperature continues to rise rapidly until it overshoots an exemplary temperature target at 95° C. Only after the temperature target is exceeded does a thermal mitigation algorithm kick in and throttle the thermal aggressor, as can be seen in the solid line at time "1." But, because the temperature has overshot the target threshold so significantly, the reaction of the thermal mitigation algorithm is to drastically throttle the thermal aggressor down to just over 20%. As one of ordinary skill in the art would recognize, the precipitous drop in performance, especially over such a short amount of time, will cause a noticeable drop in user experience as measured by QoS.

Returning to the graph 500A, between time "1" and "2" the temperature drops back below the target threshold (thanks to the throttling action on the thermal aggressor) and the thermal mitigation algorithm responds by ramping the performance level back up until the measured temperature stabilizes near the target threshold. Notably, the exemplary thermal event illustrated by the graph 500A causes a primary thermal mitigation algorithm to drastically throttle the thermal aggressor.

Figure 6:
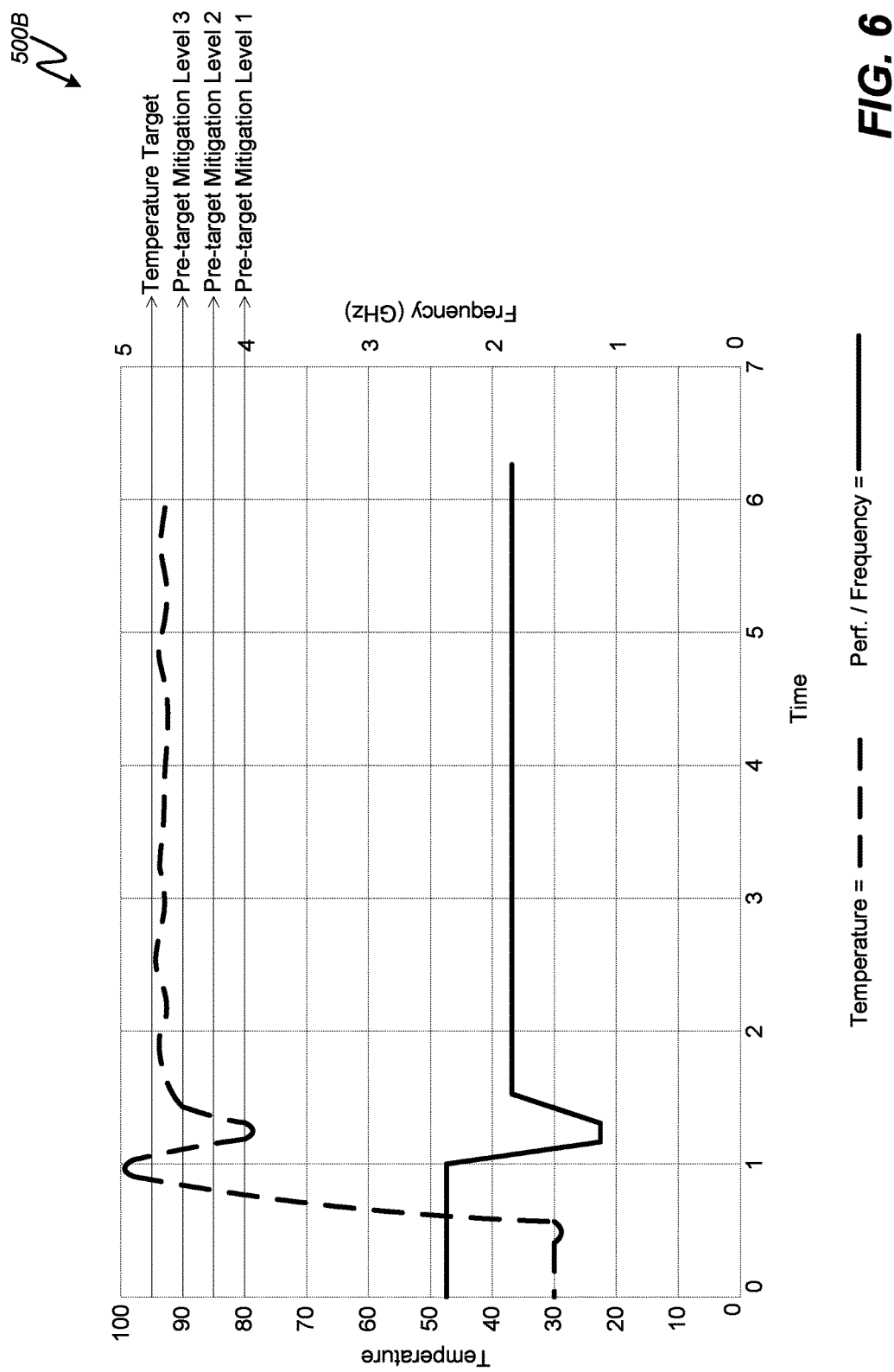
FIG. 6 is a graph illustrating exemplary pre-target mitigation levels at which an embodiment of the solution may take action to avoid a temperature overshoot such as the one depicted in the FIG. 1 graph.

FIG. 6 is a graph 500B illustrating exemplary pre-target mitigation levels at which an embodiment of the solution may take action to avoid a temperature overshoot such as the one depicted in the FIG. 5 graph 500A. As can be seen in the FIG. 6 graph 500B, the steep ramp in temperature may be used to trigger installation of a series of pre-target mitigation levels prior to the temperature overshooting the temperature target and activating a primary thermal mitigation algorithm. By executing thermal mitigation steps, such as modest throttling actions, at the pre-target mitigation levels the dashed temperature curve in graph 500 may be smoothed such that the target temperature threshold is approached gradually so that a primary thermal mitigation algorithm may take control of thermal management without having to introduce drastic throttle actions. The temperature and performance curves that may result from execution of an exemplary embodiment of the solution in response to the same exemplary thermal event depicted in graphs 200 are shown and explained in subsequent figures.

Figure 7:
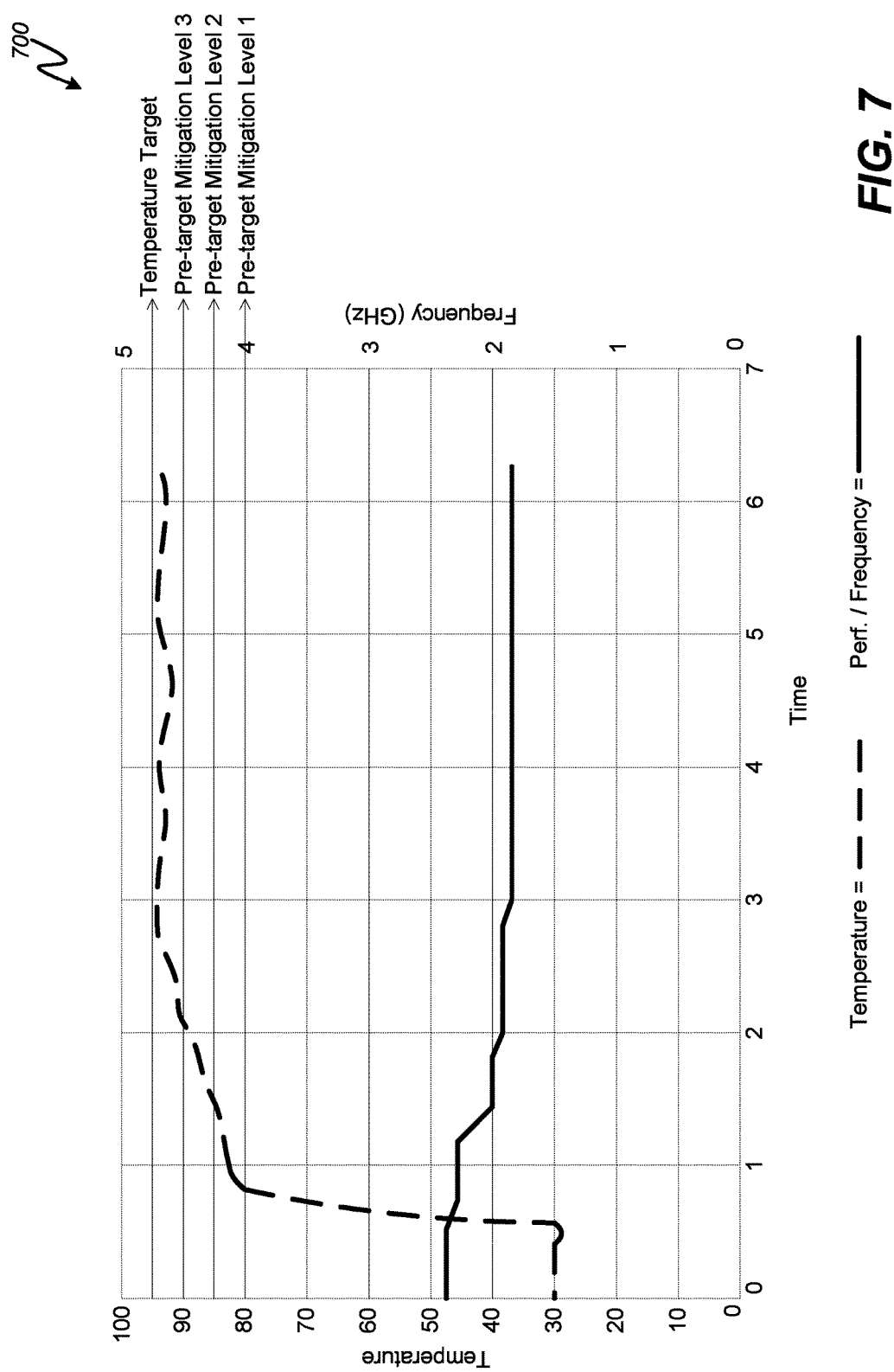
FIG. 7 is a graph illustrating exemplary effects on processor performance by an exemplary embodiment of the solution proactively smoothing the ramp of temperature increase in response to a steep temperature rise event.

FIG. 7 is a graph 700 illustrating exemplary effects on processor performance by an exemplary embodiment of the solution proactively smoothing the ramp of temperature increase in response to a steep temperature rise event similar to the event depicted in graphs 500. Turning to the graph 700, an exemplary steep temperature rise is depicted by the dashed plot between time "0" and time "1." As the temperature reaches a pre-target mitigation level 1, the exemplary embodiment of the solution applies modest performance throttling such that the rise in temperature continues but on a more gradual, "flatter" path. Subsequently, as the temperature continues to rise to pre-target mitigation level 2 and pre-target mitigation level 3, the embodiment applies more throttling to the thermal aggressor so that the temperature rise is tempered to slowly approach the exemplary 95° C. target threshold. Advantageously, by setting the pre-target mitigation levels and sequentially applying modest throttling actions, the exemplary embodiment works to slow and "smooth" the temperature rise toward the target temperature threshold.

Further, because the pre-target mitigation actions were not in response to a critical thermal event requiring an action that reverses course of a temperature reading, the thermal aggressor was only throttled from its starting 50% performance level down to a ~38% performance level. In these ways, the exemplary embodiment of the solution was able to hand off thermal management responsibilities to a primary thermal management algorithm when the temperature reached or neared the target temperature without the primary algorithm having to react to a temperature overshoot. Also, the user experience was optimized as the thermal aggressor was not throttled drastically throughout the process in response to large swings in thermal energy generation.

Figure 8:
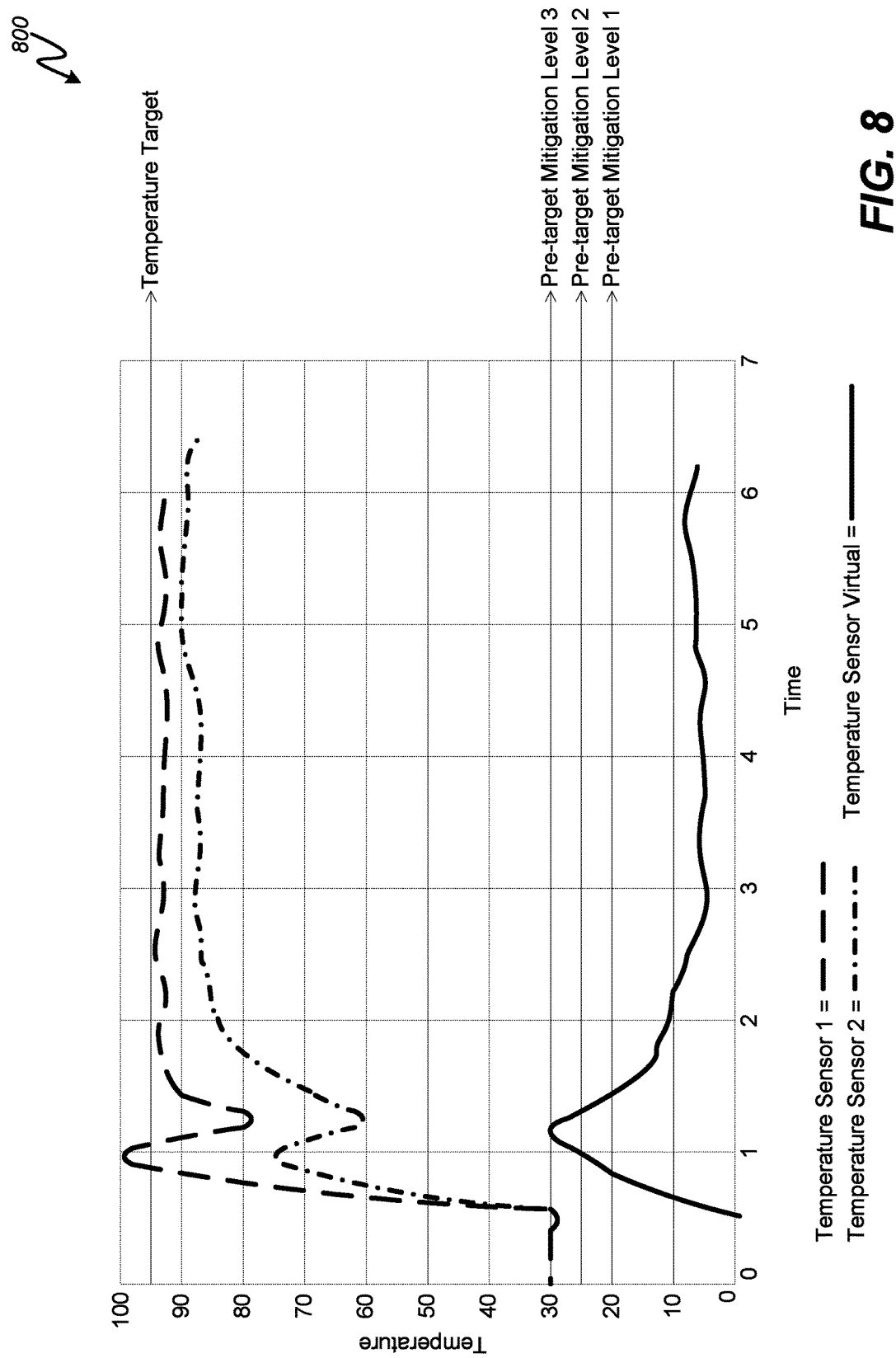
FIG. 8 is a graph illustrating the behavior of an exemplary virtual temperature sensor that may be leveraged by certain embodiments of the solution to proactively smooth the ramp of temperature increase in response to a steep temperature rise event.

FIG. 8 is a graph 800 illustrating the behavior of an exemplary virtual temperature sensor that may be leveraged by certain embodiments of the solution to proactively smooth the ramp of temperature increase in response to a steep temperature rise event. In the graph 800 illustration, the dashed line represents temperature as measured by a first temperature sensor located near a thermal aggressor, such as a junction temperature of a CPU.

The dash-dot line represents a temperature as measured by a second temperature sensor located remotely from the first temperature sensor. The second temperature sensor may be considered a "baseline" sensor that would be relatively cool at the point of a thermal event detection by sensor temperature 1.

As understood by one of ordinary skill in the art, thermal energy generated by, and emanating from, a thermal aggressor would be detected quickly by temperature sensor 1 (dashed plot) but would not register on the remote temperature sensor 2 until sometime later when the energy had propagated out to the location of temperature sensor 2. Recognizing this reality, embodiments of the solution may leverage a measurement calculated by a virtual sensor, as depicted in the graph 400 with a solid line.

At the beginning of a steep increase in thermal energy, for the reasons explained above, the delta between the readings of temperature sensors 1 and 2 will be at its greatest, but as time moves forward and the energy dissipates out across the SoC, the delta between the sensors will minimize and stabilize. The virtual sensor measurement is calculated based on the delta of the measurements between sensors 1 and 2 and, as such, may be used to detect a thermal event with a sudden and steep temperature rise.

Figure 9:
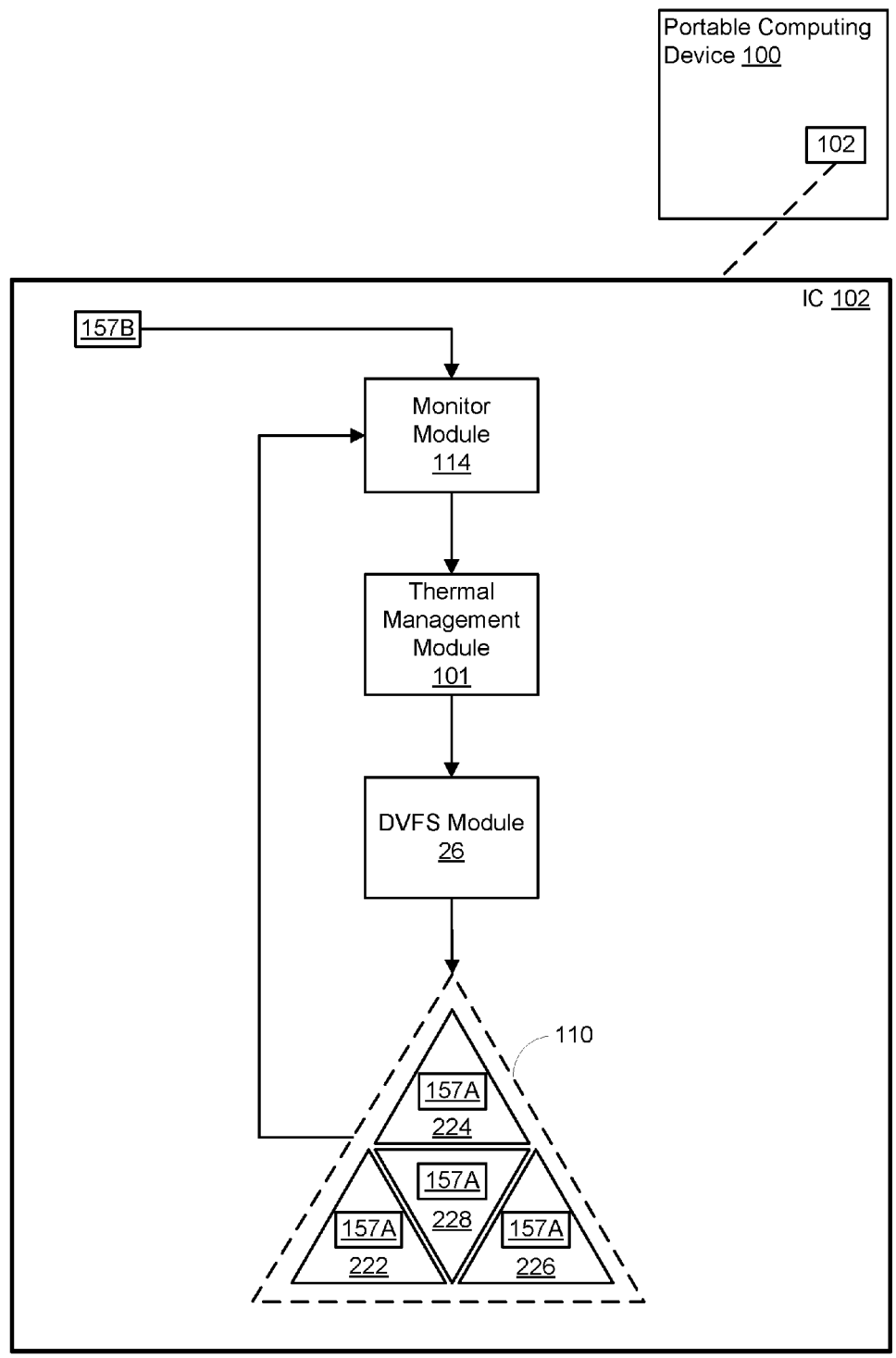
FIG. 9 is a functional block diagram illustrating another exemplary embodiment of an on-chip system (like FIG. 1) for implementing intelligent thermal management of a temperature in a portable computing device ("PCD") through temperature ramp smoothing.

FIG. 9 is similar to FIG. 1 and is a functional block diagram illustrating an embodiment of an on-chip system 102 for implementing intelligent thermal management of a temperature in a portable computing device ("PCD") through temperature ramp smoothing. One difference between the embodiment of FIG. 1 and FIG. 9 is that the embodiment of FIG. 9 does not have a temperature sensor 157C for the outer shell 24. However, it is possible that such a temperature sensor 157C could be included without departing from the scope of the exemplary embodiment described below for FIG. 9

Advantageously, by detecting a steep temperature rise and in response establishing one or more pre-target temperature mitigation levels and actions for one or more thermally aggressive processing components, embodiments of intelligent thermal management systems and methods, such as the one illustrated in FIG. 9, may avoid target temperature overshoots that cause a primary thermal mitigation technique to overly throttle to the detriment of user experience ("Ux"). In general, the system employs three main modules which, in some embodiments, may be contained in one or two modules: (1) a dynamic frequency and voltage scaling ("DVFS") module 26 for throttling performance levels of a thermally aggressive processing component; (2) a monitor module 114 for monitoring temperature readings from a designated temperature sensor(s); and (3) a Thermal Management ("TM") module 101 for setting pre-target mitigation levels and adjusting performance ceilings and working with the DVFS module 26 to throttle thermally aggressive processing components.

Advantageously, embodiments of the system and method that include the three main modules optimize the overall Ux by smoothing steep temperature spikes to avoid target temperature overshoots. In the exemplary embodiment of FIG. 9, monitor module 114 monitors temperature sensors such as sensors 157A associated with core junction temperatures and/or sensors 157B which may be used as a baseline sensor for instantiating a virtual sensor.

As depicted in the FIG. 9 illustration, CPU 110 is a heterogeneous processing component comprised of multiple cores 222, 226, 224, 228, any one or more of which may be generating excess thermal energy that, when dissipated, affects the junction temperature (i.e., its operating temperature) and, eventually, dissipates to affect a remote sensor 157B. The monitor module 114 may relay data indicative of the temperature measured by the sensors 157 to the TM module 101.

Notably, a steep or rapid change in a temperature measured by a sensor 157 may be recognized by the monitor module 114 and relayed to TM module 101. The TM module 101 may, in turn, establish one or more pre-target mitigation levels with a series of associated performance ceilings for the CPU 110 to ensure that the temperature rise rate is tempered to more gradually approach a target threshold.

From the data provided by the monitor module 114, the TM module 101 may recognize that a thermal temperature threshold will be overshot and determine that a performance level associated with active, thermally aggressive processing components (e.g., CPU 110 in the FIG. 2 illustration) should be adjusted in order to mitigate ongoing thermal energy generation and slow the rate of temperature rise. Subject to the performance level ceilings for the established pre-target mitigation levels, the TM module 101 may instruct the DVFS module 26 to determine appropriate adjustments to the performance level setting of the CPU 110.

As the temperature continues to rise, albeit on a gentler slope, and nears the target temperature threshold, the TM module 101 may switch thermal management to a primary thermal management policy and instruct the DVFS module 26 to determine appropriate adjustments to the performance levels within the constraints dictated by the primary thermal management technique. Advantageously, the pre-target mitigation solution will have avoided a temperature overshoot of the target temperature, thereby ensuring that when the TM module 101 switches control over to the primary thermal management technique drastic throttling of the thermal aggressors would not be necessary.

Notably, although the exemplary embodiment illustrated in FIG. 9 offers the heterogeneous CPU 110 as a thermal aggressor that may be throttled according to an embodiment of an intelligent thermal management solution, it will be understood that embodiments of the solution may be applicable to any thermally aggressive processing component in need of throttling to affect a temperature reading as measured by a temperature sensor. As such, although the exemplary embodiment illustrates a CPU 110 being throttled in view of a reading generated by a sensor 157A (or a virtual sensor calculated by a delta between sensors 157A and 157B), it is envisioned that embodiments of the solution are applicable to other combinations of sensors and processing components. The scope of this disclosure, therefore, is not limited to the specific applications described herein.

Figure 10:
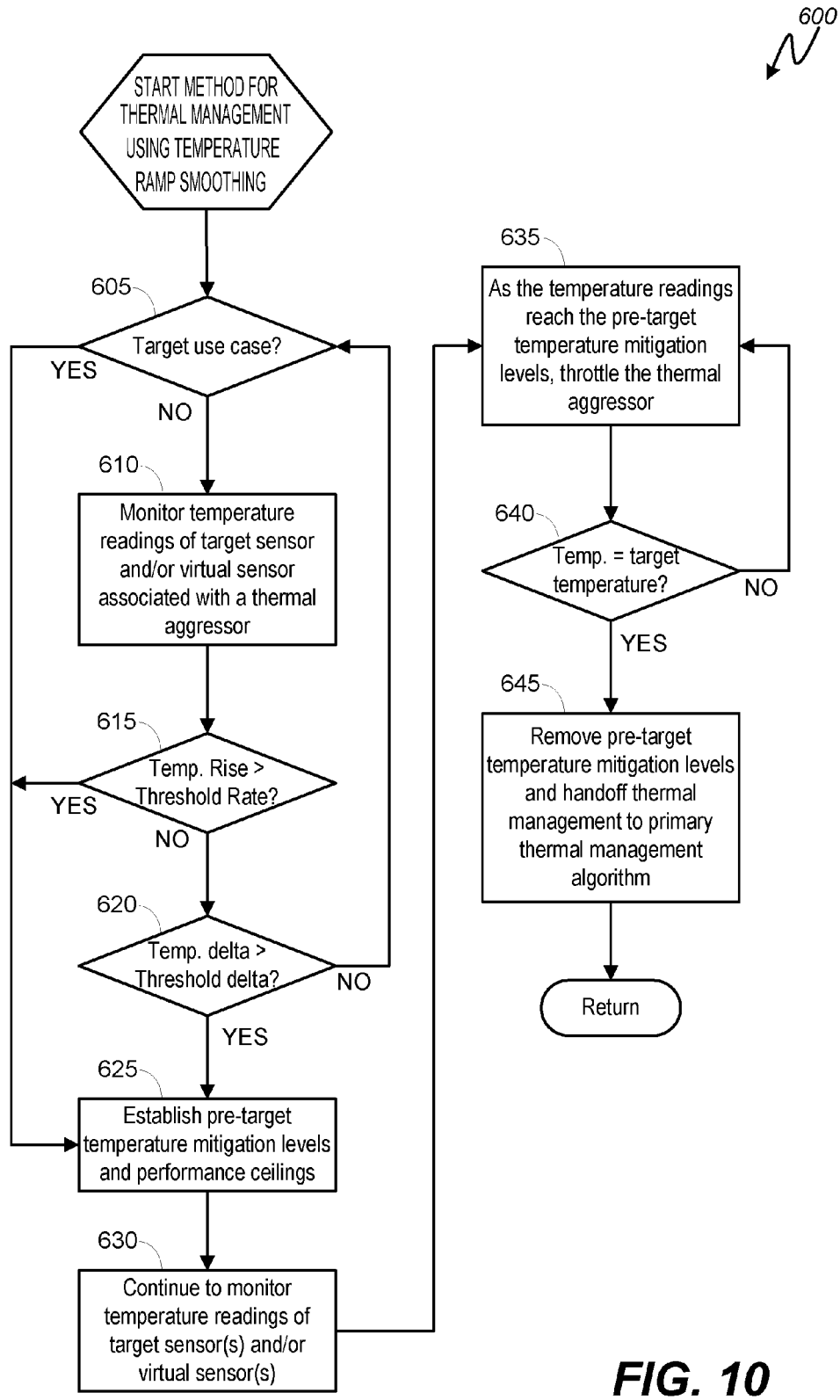
FIG. 10 depicts a logical flowchart illustrating a method for intelligent thermal management in the PCD of FIG. 2 through temperature ramp smoothing.

FIG. 10 depicts a logical flowchart illustrating a method 600 for intelligent thermal management in the PCD of FIG. 2 through temperature ramp smoothing. Beginning at block 605, the method 600 may determine if a certain use case known to cause sudden and steep temperature increases is active. If so, the method 600 may follow the "yes" branch down to block 625 and begin to employ pre-target mitigation techniques. If not, then the "no" branch is followed to block 610 and designated temperature readings are monitored to detect any steep ramp in thermal energy generation that would require smoothing to avoid a target temperature overshoot.

The temperature monitored at block 610 may be a temperature reading from a sensor associated with a junction temperature, for example, or may be a temperature reading from a virtual sensor that represents a delta between two actual temperature sensors (one located near the origin of thermal generation and one located remotely on the SoC).

At decision block 615, if the temperature sensor indicates a temperature rise that is steeper (i.e., faster) than a threshold acceptable rate of temperature rise, then the "yes" branch down to block 625 and begin to employ pre-target mitigation techniques. If, at decision block 615, the temperature sensor does not indicate a temperature rise that is steeper (i.e., faster) than a threshold acceptable rate, then the method 600 proceeds to decision block 620 and a delta measurement quantified by a virtual sensor is evaluated to determine if a thermal event warranting pre-target mitigation has occurred.

If not, then the "no" branch is followed back to decision block 605 and the method 600 continues again. If "yes" at decision block 620, then like the "yes" branches of decision blocks 605 and 615, the method 600 proceeds to block 625 to begin pre-target mitigation.

At block 625, pre-target temperature mitigation levels are established along with performance ceilings for each level. At block 630, the temperature sensor(s) and/or virtual sensor(s) continue to be monitored to detect when the pre-target mitigation levels are reached. At block 635, as each pre-target mitigation level is reached according to the measured temperature, the thermal aggressors responsible for the steep increase in thermal energy generation are throttled to the associated performance ceilings, thereby smoothing and slowing the rate of temperature increase as the thermal energy levels approach the target temperature threshold.

At decision block 640, the measured temperature (or virtual sensor delta) is monitored to determine when it has reached, or approached, the target temperature threshold. If it has not reached the target temperature threshold, the "no" branch is followed back to block 635 and the method continues to reduce performance ceilings in association with each pre-target mitigation level. If, or when, the temperature measurement indicates that the target temperature threshold has been reached or is nearing, the method 600 follows the "yes" branch to block 645 and hands off thermal management to a primary thermal management technique.

The formerly established pre-target mitigation levels may be removed and the primary thermal management technique allowed to execute thermal management actions without having to react to a temperature that has overshot the target threshold and reached a critical level. The method 600 returns.

Figure 11:
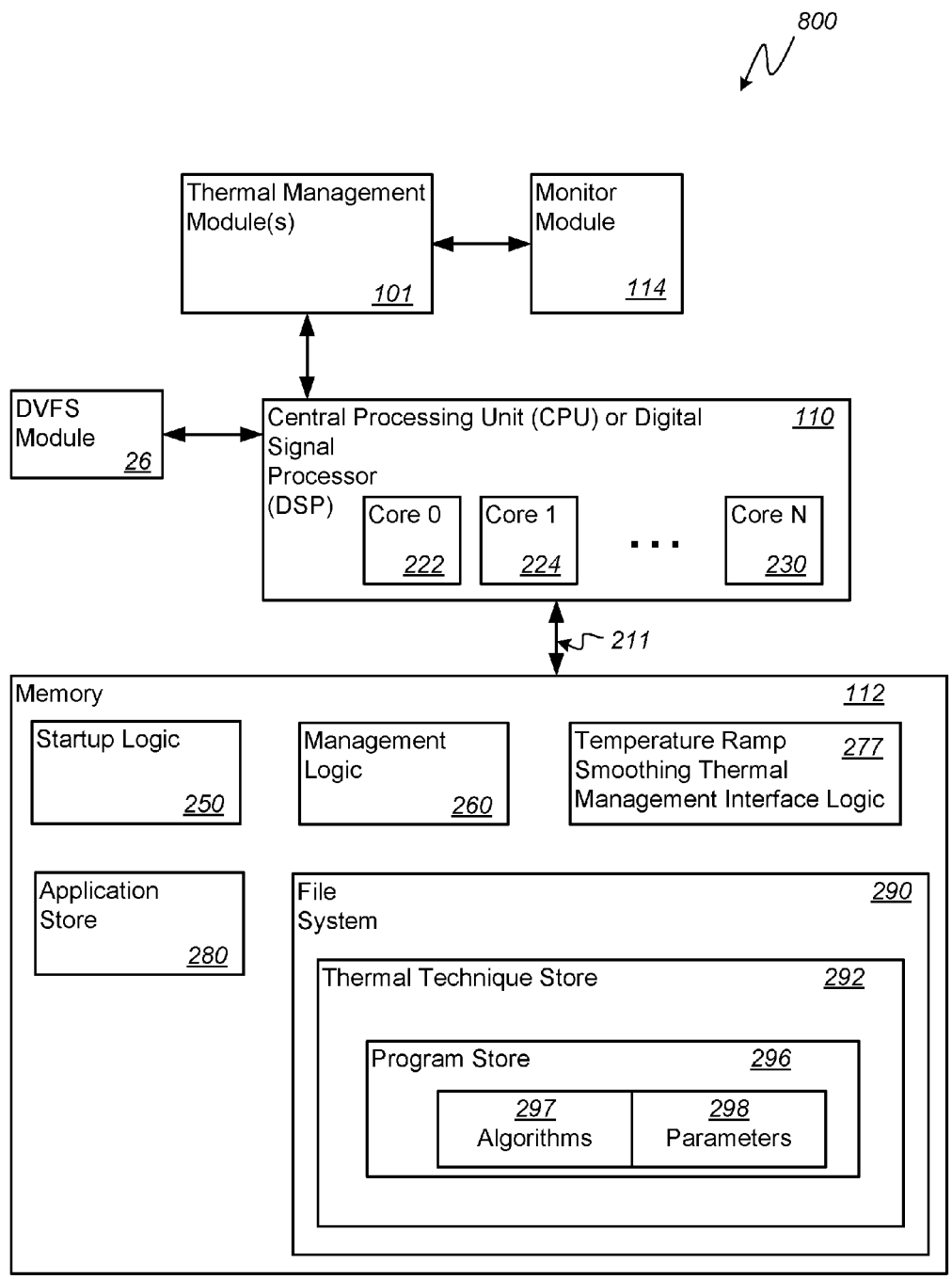
FIG. 11, which is similar to FIG. 1, is a schematic diagram illustrating an exemplary software architecture of the PCD of FIG. 2 for intelligent thermal management.

FIG. 11 is a schematic diagram illustrating an exemplary software architecture of the PCD of FIG. 2 for intelligent thermal management. FIG. 11 is similar to FIG. 1. So only the differences between the exemplary embodiments of these two figures will be emphasized below. Components of FIG. 11 with identical reference numerals relative to FIG. 3 will usually operate in a manner as described previously in connection with FIG. 3.

One main difference between these two exemplary embodiments is that the embodiment of FIG. 3 has dynamic performance floor thermal management interface logic 270 in memory 112, while the embodiment of FIG. 11 has temperature ramp smoothing thermal management interface logic 277 in memory 112 instead of dynamic performance floor thermal management interface logic 270.

The performance level settings of this exemplary embodiment of FIG. 11 may be adjusted subject to performance level ceilings associated with pre-target mitigation levels established in answer to recognition of a steep temperature rise. When the logic used by the PCD 100 is implemented in software, as is shown in FIG. 11, it should be noted that one or more of startup logic 250, management logic 260, temperature ramp smoothing thermal management interface logic 277, applications in application store 280 and portions of the file system 290 may be stored on any computer-readable medium (or device) for use by, or in connection with, any computer-related system or method.

In an alternative embodiment, where one or more of the startup logic 250, management logic 260 and perhaps the temperature ramp smoothing thermal management interface logic 277 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As noted above in connection with FIG. 3, the startup logic 250 may include one or more executable instructions for selectively identifying, loading, and executing a select program for managing or controlling the performance of one or more of the available cores such as the first core 222, the second core 224 through to the N$^{th}$ core 230. The startup logic 250 may identify, load and execute a select program for intelligent thermal management based on temperature ramp smoothing using temperature ramp smoothing thermal management interface logic 277 as illustrated in FIG. 11. An exemplary select program can be found in the program store 296 of the embedded file system 290 and is defined by a specific combination of an intelligent thermal management algorithm 297 and a set of parameters 298. The exemplary select program, when executed by one or more of the core processors in the CPU 110 may operate in accordance with one or more signals provided by the monitor module 114 in combination with control signals provided by the one or more DVFS module(s) 26 and/or TM module(s) 101 to adjust the performance setting associated with a particular active component "up" or "down."

Like the interface logic 270 of FIG. 3, the temperature ramp smoothing thermal management interface logic 277 may have one or more executable instructions for presenting, managing and interacting with external inputs to observe, configure, or otherwise update information stored in the embedded file system 290. In one embodiment, the interface logic 277 of FIG. 11 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the parameters associated with throttling a particular thermally aggressive component according to a pre-target mitigation level established in response to recognition of a certain rate of temperature rise.

Like FIG. 3, the interface logic 277 of FIG. 11 may enable a manufacturer to controllably configure and adjust an end user's experience under defined operating conditions on the PCD 100. When the memory 112 is a flash memory, one or more of the startup logic 250, the management logic 260, the interface logic 277, the application programs in the application store 280 or information in the embedded file system 290 can be edited, replaced, or otherwise modified. In some embodiments, the interface logic 277 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for intelligent thermal management in a portable computing device ("PCD"), the method comprising:

monitoring a temperature reading generated by a target temperature sensor;

comparing the temperature reading to a temperature threshold;

determining that the temperature reading exceeds the temperature threshold;

setting a first performance level floor for at least one thermally aggressive processing component;

setting a first temperature tolerance in association with the first performance level floor; and reducing a performance level of the processing component to a first lower performance level, wherein the first lower performance level is higher than the first performance level floor.

2. The method of claim 1, further comprising:
    determining that the temperature reading remains in excess of the temperature threshold after the performance level of the processing component was reduced to the first lower performance level; and
    reducing the performance level of the processing component to a second lower performance level, wherein the second lower performance level is higher than the first performance level floor.

3. The method of claim 2, further comprising:
    determining that the temperature reading remains in excess of the temperature threshold after the performance level of the processing component was reduced to the second lower performance level; and
    reducing the performance level of the processing component to a third lower performance level, wherein the third lower performance level is equivalent to the first performance level floor.

4. The method of claim 3, further comprising:
    determining that the temperature reading remains in excess of the temperature threshold after the performance level of the processing component was reduced to the third lower performance level equivalent to the first performance level floor; and
    maintaining the performance level of the processing component at the third lower performance level.

5. The method of claim 4, further comprising:
    determining that the temperature reading is in excess of the temperature threshold plus the first temperature tolerance;
    adjusting the performance level floor for at least one thermally aggressive processing component to a next lower performance level floor;
    adjusting the first temperature tolerance to a second temperature tolerance setting associated with the next lower performance level floor; and
    reducing the performance level of the processing component to a fourth lower performance level, wherein the fourth lower performance level is lower than the first performance level floor and higher than the next lower performance level floor.

6. The method of claim 5, further comprising:
    determining that the temperature reading is less than the temperature threshold plus the first temperature tolerance; and
    adjusting the performance level floor for at least one thermally aggressive processing component back to the first performance level floor;
    adjusting the second temperature tolerance back to the first temperature tolerance setting associated with the first performance level floor; and
    increasing the performance level of the processing component, wherein the increased performance level is equivalent to, or higher than, the first performance level floor.

7. The method of claim 1, wherein the temperature reading is associated with a skin temperature of the PCD.

8. The method of claim 1, wherein the target temperature sensor is a thermistor.

9. A computer system for intelligent thermal management in a portable computing device ("PCD"), the system comprising:
    a monitor module, a dynamic voltage and frequency module, and a thermal manager module collectively configured to:
        monitor a temperature reading generated by a target temperature sensor;
        compare the temperature reading to a temperature threshold;
        determine that the temperature reading exceeds the temperature threshold;
        set a first performance level floor for at least one thermally aggressive processing component;
        set a first temperature tolerance in association with the first performance level floor; and
        reduce a performance level of the processing component to a first lower performance level, wherein the first lower performance level is higher than the first performance level floor.

10. The system of claim 9, wherein the monitor module, dynamic voltage and frequency module, and thermal manager module are further collectively configured to:
    determine that the temperature reading remains in excess of the temperature threshold after the performance level of the processing component was reduced to the first lower performance level; and
    reduce the performance level of the processing component to a second lower performance level, wherein the second lower performance level is higher than the first performance level floor.

11. The system of claim 10, wherein the monitor module, dynamic voltage and frequency module, and thermal manager module are further collectively configured to:
    determine that the temperature reading remains in excess of the temperature threshold after the performance level of the processing component was reduced to the second lower performance level; and
    reduce the performance level of the processing component to a third lower performance level, wherein the third lower performance level is equivalent to the first performance level floor.

12. The system of claim 11, wherein the monitor module, dynamic voltage and frequency module, and thermal manager module are further collectively configured to:
    determine that the temperature reading remains in excess of the temperature threshold after the performance level of the processing component was reduced to the third lower performance level equivalent to the first performance level floor; and
    maintain the performance level of the processing component at the third lower performance level.

13. The system of claim 12, wherein the monitor module, dynamic voltage and frequency module, and thermal manager module are further collectively configured to:
    determine that the temperature reading is in excess of the temperature threshold plus the first temperature tolerance;
    adjust the performance level floor for at least one thermally aggressive processing component to a next lower performance level floor;
    adjust the first temperature tolerance to a second temperature tolerance setting associated with the next lower performance level floor; and
    reduce the performance level of the processing component to a fourth lower performance level, wherein the fourth lower performance level is lower than the first performance level floor and higher than the next lower performance level floor.

14. The system of claim 13, wherein the monitor module, dynamic voltage and frequency module, and thermal manager module are further collectively configured to:
    determine that the temperature reading is less than the temperature threshold plus the first temperature tolerance; and adjust the performance level floor for at least one thermally aggressive processing component back to the first performance level floor;
adjust the second temperature tolerance back to the first temperature tolerance setting associated with the first performance level floor; and
increase the performance level of the processing component, wherein the increased performance level is equivalent to, or higher than, the first performance level floor.

15. The system of claim 9, wherein the temperature reading is associated with a skin temperature of the PCD.

16. The system of claim 9, wherein the target temperature sensor is a thermistor.

17. A computer system for intelligent thermal management in a portable computing device, the system comprising:
means for monitoring a temperature reading generated by a target temperature sensor;
means for comparing the temperature reading to a temperature threshold;
means for determining that the temperature reading exceeds the temperature threshold;
means for setting a first performance level floor for at least one thermally aggressive processing component;
means for setting a first temperature tolerance in association with the first performance level floor; and
means for reducing a performance level of the processing component to a first lower performance level, wherein the first lower performance level is higher than the first performance level floor.

18. The computer system of claim 17, further comprising:
means for determining that the temperature reading remains in excess of the temperature threshold after the performance level of the processing component was reduced to the first lower performance level; and
means for reducing the performance level of the processing component to a second lower performance level, wherein the second lower performance level is higher than the first performance level floor.

19. The computer system of claim 18, further comprising:
means for determining that the temperature reading remains in excess of the temperature threshold after the performance level of the processing component was reduced to the second lower performance level; and
means for reducing the performance level of the processing component to a third lower performance level, wherein the third lower performance level is equivalent to the first performance level floor.

20. The computer system of claim 19, further comprising:
means for determining that the temperature reading remains in excess of the temperature threshold after the performance level of the processing component was reduced to the third lower performance level equivalent to the first performance level floor; and
means for maintaining the performance level of the processing component at the third lower performance level.

21. The computer system of claim 20, further comprising:
means for determining that the temperature reading is in excess of the temperature threshold plus the first temperature tolerance;
means for adjusting the performance level floor for at least one thermally aggressive processing component to a next lower performance level floor;
means for adjusting the first temperature tolerance to a second temperature tolerance setting associated with the next lower performance level floor; and
means for reducing the performance level of the processing component to a fourth lower performance level, wherein the fourth lower performance level is lower than the first performance level floor and higher than the next lower performance level floor.

22. The computer system of claim 21, further comprising:
means for determining that the temperature reading is less than the temperature threshold plus the first temperature tolerance; and
means for adjusting the performance level floor for at least one thermally aggressive processing component back to the first performance level floor;
means for adjusting the second temperature tolerance back to the first temperature tolerance setting associated with the first performance level floor; and
means for increasing the performance level of the processing component, wherein the increased performance level is equivalent to, or higher than, the first performance level floor.

23. The computer system of claim 17, wherein the temperature reading is associated with a skin temperature of the PCD.

24. A method for intelligent thermal management in a portable computing device ("PCD"), the method comprising:
monitoring a temperature reading generated by a temperature sensor;
determining that the temperature reading indicates a temperature rise in excess of a temperature rise rate threshold;
establishing one or more pre-target mitigation levels, wherein a pre-target mitigation level is associated with a temperature less than a target temperature threshold;
establishing a performance level ceiling in association with each of the one or more pre-target mitigation levels;
as the temperature reading exceeds each of the one or more pre-target mitigation levels, adjusting a performance level of a thermal aggressor to the associated performance level ceiling;
determining that the temperature reading exceeds the target temperature threshold; and
removing the one or more pre-target mitigation levels and associated performance level ceilings.

25. The method of claim 24, further comprising:
executing a primary thermal mitigation technique in response to determining that the temperature reading exceeds the target temperature threshold.

26. The method of claim 24, wherein the temperature sensor is associated with a junction temperature in the thermal aggressor.

27. The method of claim 24, wherein the temperature sensor is associated with a skin temperature of the PCD.

28. The method of claim 24, wherein the temperature sensor is a virtual sensor that generates a reading calculated based on a delta between a pair of actual sensors.

29. The method of claim 28, wherein one of the pair of actual sensors is associated with a skin temperature of the PCD.

30. The method of claim 24, wherein the PCD comprises at least one of a: a cellular telephone, a satellite telephone, a pager, a personal digital assistant (PDA), a smartphone, a navigation device, a smartbook or reader, a media player, and a computer with a wireless connection.

* * * * *